Dec. 26, 1939.  J. WACKLER  2,184,825
TURNING DEVICE FOR CUTTER SLEEVES OF DOUGHNUT MACHINES
Filed May 15, 1939  4 Sheets-Sheet 1

INVENTOR
John Wackler
BY
ATTORNEY

Dec. 26, 1939.  J. WACKLER  2,184,825
TURNING DEVICE FOR CUTTER SLEEVES OF DOUGHNUT MACHINES
Filed May 15, 1939  4 Sheets-Sheet 2

INVENTOR
John Wackler
BY
ATTORNEY

Dec. 26, 1939.   J. WACKLER   2,184,825
TURNING DEVICE FOR CUTTER SLEEVES OF DOUGHNUT MACHINES
Filed May 15, 1939   4 Sheets-Sheet 3

INVENTOR
John Wackler
BY
ATTORNEY

Dec. 26, 1939.                J. WACKLER                    2,184,825
           TURNING DEVICE FOR CUTTER SLEEVES OF DOUGHNUT MACHINES
                         Filed May 15, 1939           4 Sheets-Sheet 4

INVENTOR
John Wackler
BY
ATTORNEY

Patented Dec. 26, 1939

2,184,825

UNITED STATES PATENT OFFICE 2,184,825

TURNING DEVICE FOR CUTTER SLEEVES OF DOUGHNUT MACHINES

John Wackler, New York, N. Y.

Application May 15, 1939, Serial No. 273,614

9 Claims. (Cl. 107—14)

This invention relates to new and useful improvements in a turning device for the cutter sleeves of doughnut machines.

This invention contemplates new and useful results in the making of doughnuts by using a turning device for the cutter sleeves of the doughnut machines. It is proposed that the cutter sleeves be given a periodic turn or rotation to affect the texture of the doughnuts produced.

Still further the invention contemplates an arrangement to control the degree of turning or rotation to vary the effect on the finished doughnuts.

The invention, in essence, contemplates a device to give to the sleeve of the cutter or cutters of a doughnut machine a periodic twist, or turn adapted to be controlled as to degree of rotation for each period or cycle of operation of the doughnut machine.

The invention has for one of its objectives the utilization of certain mechanical constructions to affect the doughnut in the process of its manufacture, which effect will essentially be due to a slight turn given to the sleeve of the cutter, which slight turn of the sleeve is adapted to be controlled so as to control the degree of turning or rotation given to the sleeve of the cutter to produce a desired effect. The turning of the sleeve of the cutter in accordance with this invention is to be periodic and the number of turns is to be equal to the number of cuttings or cycles of the machine per unit of time or cycle of machine operation. The turning periods are arranged to be spaced between the cutting periods of the doughnuts.

The invention, through the above-mentioned operations utilizes the adhesive qualities of the dough from which the doughnuts are made for obtaining the results desired. This quality of the dough causes the dough to adhere to the inside wall of the sleeve of the cutter where the dough makes contact with same. It follows, then, that as soon as the sleeve of the cutter is rotated that the dough within the same, at the point of contact, will also be circularly drawn thereby imparting a certain tenseness and compactness to the dough just before a doughnut is cut therefrom.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 8 is a fragmentary vertical sectional view taken on the line 8—8 of Fig. 7.

Figure 1:
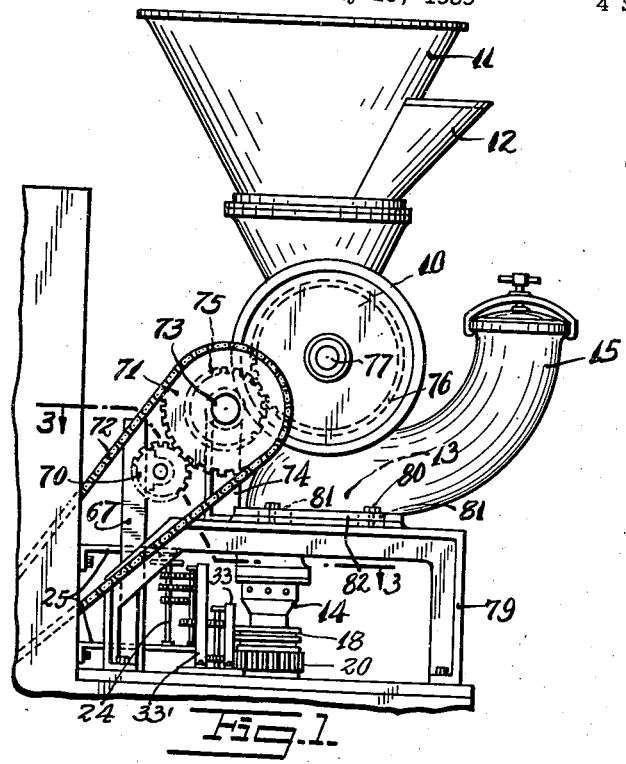
Fig. 1 is a side elevational view of a doughnut machine with a turning device for the cutters thereof constructed according to this invention.
Figure 2:
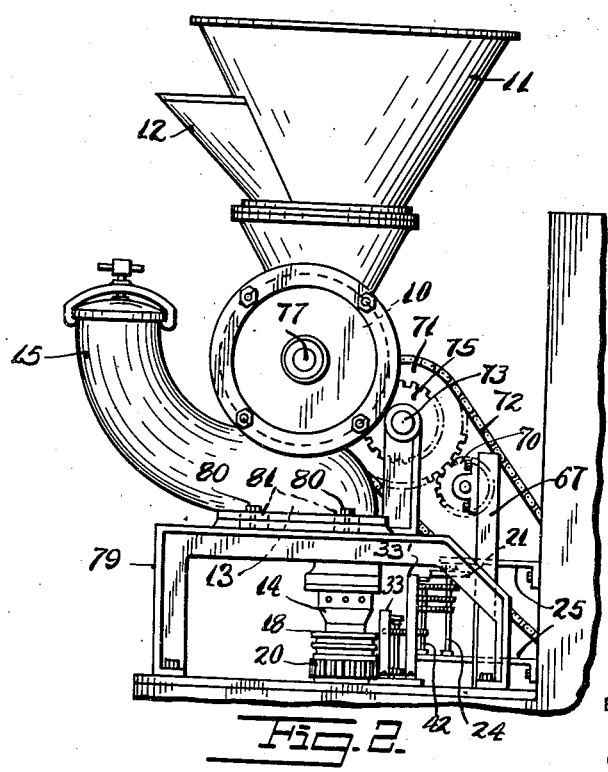
Fig. 2 is an elevational view looking from the other end of the machine.

The turning device for the cutters of a doughnut machine, in accordance with this invention, may be used with many of the present day doughnut machines. For this purpose the invention is shown applied to a doughnut machine having a cylinder 10 in which the dough is placed. A hopper 11 is mounted on the top of the cylinder through which dough may be supplied to the cylinder. This hopper has a side projecting portion 12 acting as an air vent. The cylinder 10 is adapted to discharge the mixed dough to a chamber 13 which connects with a plurality of downward extending tubular members 14. An air chamber 15 connects with the chamber 13 to facilitate the flow of the dough. The tubular members 14 are each provided with a spider construction 16 to permit passage of the dough, and this spider construction supports a disc shaped member 17.

In accordance with this invention a cutter sleeve 18 is turnably mounted on each tubular member 14. This cutter sleeve is arranged so as to encircle the disc member 17. Particular attention is directed to Fig. 11 where the specific relationship of these parts are clearly shown. Attention is called to the area 19 immediately above the disc 17 and below the bottom edge of the tubular member 14 in which the dough is drawn to obtain the certain tenseness and compactness previously referred to.

The specific means for cutting off the ejected doughnut will not be given in this specification since it forms no part of the invention and similar devices are generally used in the present day machines.

It should be clearly understood that this invention particularly relates to a turning device for the cutter sleeves 18. In accordance with this invention a gear 20 is fixedly mounted upon the outside surface of each cutter sleeve 18. A transmission system is provided for rotating the gears 20 and so indirectly rotating the cutter sleeves, and this transmission system includes a main drive wheel 21 having a concentric annular area of teeth 22 (see Fig. 10). A ratchet 23 is cooperative with the teeth 22 in a particular fashion. A means is provided for reciprocating the ratchet 23 for periodically turning the wheel 21 through a predetermined angular distance. This rotation will be transmitted to similarly turn the gears 30 and hence the cutter sleeves.

The wheel 21 is fixed upon a vertical shaft 24 which is supported in a frame 25. The shaft 24 is equipped with three sprocket wheels 26, 27 and 28 at different vertical elevations. In the particular design of machine shown in the drawing there are three cutter sleeves. It is for this reason that there are only three sprocket wheels on the shaft 24. It is conceivable that a doughnut machine may be designed with more or less cutter sleeves, and in such event it would be required that the transmission system be varied to accommodate the different numbers of cutter sleeves. The sprockets 26, 27 and 28 are connected with a chain system to drive the gears 20 as will become clear as this specification proceeds.

Figure 3:
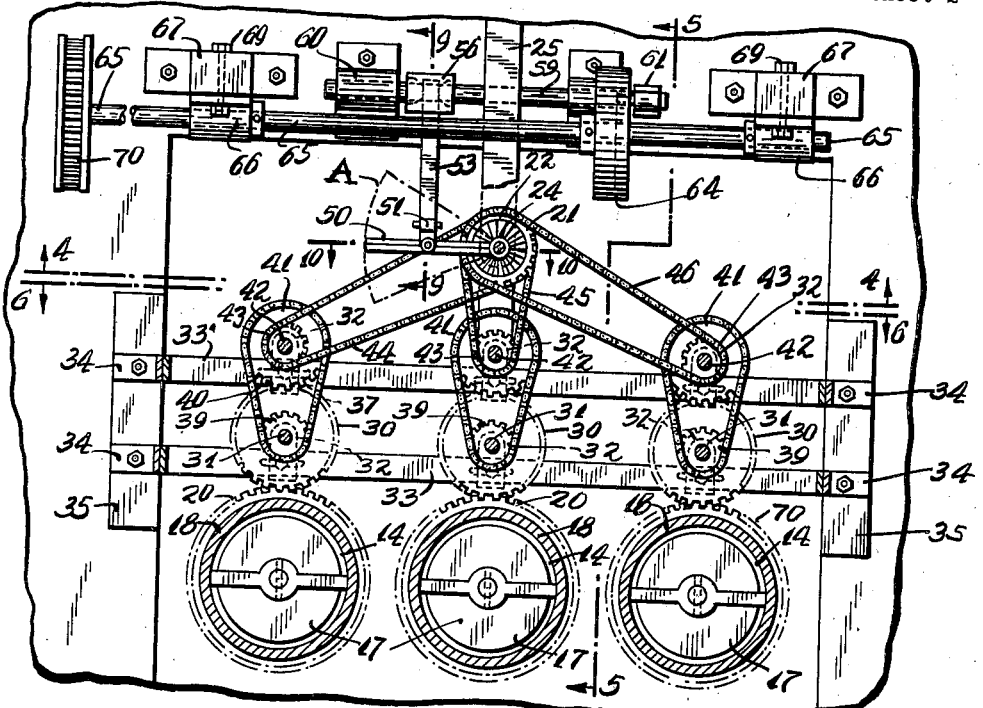
Fig. 3 is a fragmentary enlarged horizontal sectional view taken on the line 3—3 of Fig. 1.
Figure 4:
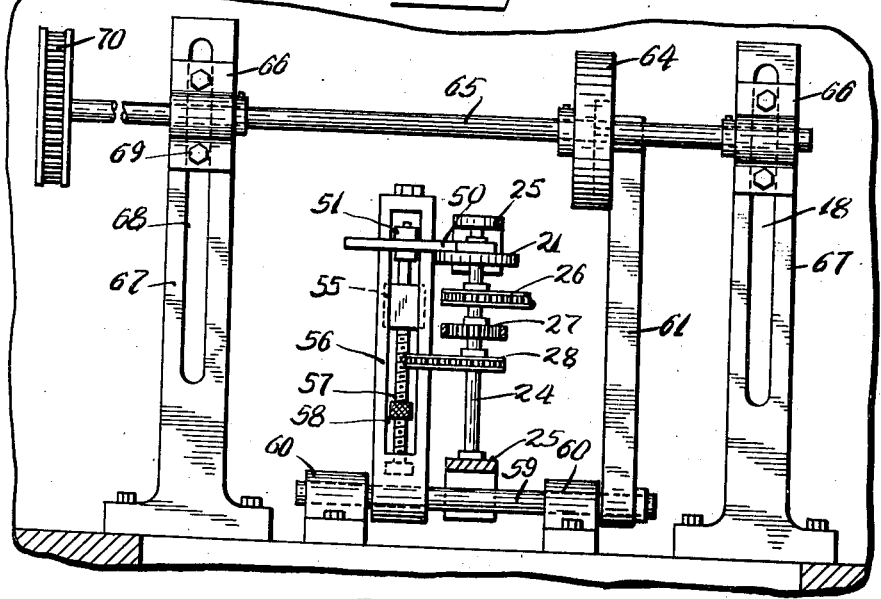
Fig. 4 is a vertical sectional view taken on the line 4—4 of Fig. 3.
Figure 5:
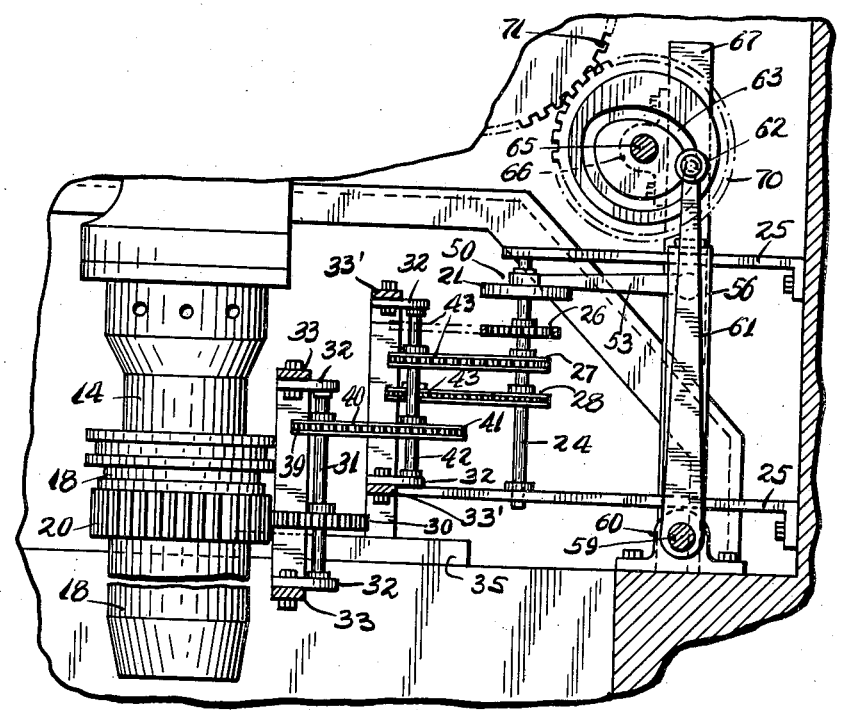
Fig. 5 is a transverse vertical sectional view taken on the line 5—5 of Fig. 3.
Figure 6:
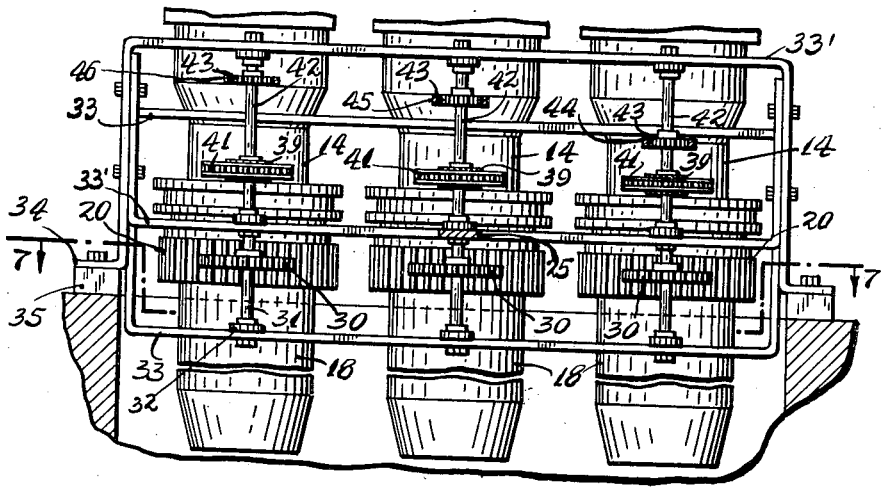
Fig. 6 is a vertical sectional view taken on the line 6—6 of Fig. 3.
Figure 7:
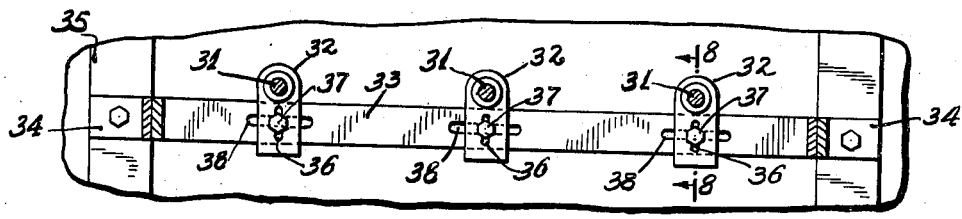
Fig. 7 is a fragmentary horizontal sectional view taken on the line 7—7 of Fig. 6.

Adjacent each gear 20 there is a gear 30 meshing therewith (see particularly Figs. 3 and 6). It is pointed out that these gears 30 are relatively narrow compared with the width of the gear 30. This is so to permit a vertical adjustment of the gear 30 as hereinafter more fully described. Each gear 30 is supported on a vertical shaft 31 which is rotatively supported on brackets 32 adjustably mounted upon a frame 33. This frame has side legs 34 by which it is mounted on stationary blocks 35. The brackets 32 are formed with slots 36 (see Fig. 8) through which holding bolts 37 pass. These bolts 37 also pass through slots 38 formed in the frame 33. The arrangement is such that the bolts 37 may be loosened and the brackets 32 shifted laterally forwards or rearwards as required.

On each shaft 31 there is a sprocket wheel 39 engaged by a chain 40 which extends rearwards and which engages over a sprocket wheel 41 mounted upon another vertical shaft 42. These vertical shafts 42 are also supported on brackets 32 which are adjustably mounted on a rear frame 33'. This rear frame is also supported on the blocks 35 (see Fig. 3). The brackets 32 are adjustably mounted on the frame 33 by the bolts 37, and the slots previously described with specific reference to Fig. 8. Each shaft 42 is provided with a sprocket wheel 43 but these sprockets are in different elevations (see Fig. 6). The elevations of the sprockets 43 correspond with the elevations of the sprockets 26, 27 and 28. Chains 44, 45 and 46 connect the respective sprockets 26, 27, 28 and the sprockets 43 together. The arrangement is such that when the shaft 24 is turned the cutter sleeves 18 will be simultaneously rotated by the transmission system.

The means previously referred to for periodically reciprocating the ratchet 23 includes a radial arm 50 turnably mounted upon the shaft 24 and supporting the ratchet 23. This radial arm has a link 51 pivotally connected therewith intermediate of its ends. The link 51 is connected by a hinge joint 52 with a radial arm 53. This radial arm 53 is pivotally mounted on a bolt 54 supported on a block 55 adjustably mounted in an arm 56. A screw 57 is rotatively supported upon the arm 56, particularly within a slot 58 thereof and controls the position of the block 55.

The radial arm 56 is fixedly mounted upon a horizontal shaft 59 which is turnably supported in bearing blocks 60. A control radial arm 61 is also mounted on the horizontal shaft 59 and at its upper end is provided with a roller 62 engaging a cam groove 63 formed within a cam 64. This cam 64 is fixed upon a shaft 65 which is rotatively supported in bearing blocks 66. These bearing blocks 66 are adjustably mounted on stationary arms 67. These arms 67 have slots 68 through which holding bolts 69 of the bearing blocks pass. It is these holding bolts and the slots which permit vertical adjustments of the blocks 66.

The shaft 65 is provided with a gear 70 meshing with a gear 71 driven by a driver chain 72. The gear 71 is mounted on a shaft 73 which is rotatively supported in a standard 74. The shaft 73 is also provided with a gear 75 meshing with a gear 76 mounted on a shaft 77 passing through the mixing cylinder 10. The arrangement is such that the driver chain 72 operates the mixer, not illustrated in detail on the drawing, but which is located within the cylinder 10.

The operation of the device is as follows:

The rotations from the driver chain 72 will be indirectly transmitted to rotate the shaft 65. Since the cam 64 is mounted on the shaft 65 it will rotate and cause the periodic rocking of the radial arm 61. This rocking will be transmitted by the shaft 59 to the radial arm 56. The connecting arm 53 and the link 51 will cause the radial arm 50 to be periodically moved through an angular distance indicated in Fig. 1 by the arc designated by the letter A. When the radial arm 50 moves in one direction the bolt 23 engages the teeth 22 and operates the transmission system to give each cutter sleeve 18 a small turn. When the radial arm 50 moves in the other direction the pawl 23 merely idles over the gear teeth 22. Hence the cutter sleeves 18 will rotate, in steps, in one direction.

However, the amplitude of the angular motion of the radial arm 50 may be controlled by adjusting a screw arrangement which is located at the end of the radial arm 50. By operating the screw arrangement located at the end of the radial arm 50, the throw of said radial arm 50 will be changed. When the cam 64 is raised or lowered relative to the roller 62 on the radial arm 61, there will be a change of the throw of the radial arm 61. This change of throw of the radial arm 61 controls, indirectly, the angular amplitude of oscillation of the radial arm 50.

When the bearing blocks 66 are adjusted upon the supports 67 it will be necessary to make suitable adjustments to maintain the mesh of the gears 70 and 71. This may be accomplished by changing the location of the standards 74. The standards 74 as well as the cylinder 10 of the doughnut machine is supported on a stationary frame 79. There are bolts 80 engaging through slots 81 formed upon flanges 82 connected with the standards 74 and the cylinder 10 to permit the adjustment required. However, when the adjustment is made the tubular members 14 will now be in different positions. In order that these tubular members may assume the required positions the various adjustments for the brackets 32 have been provided. These brackets are also adjustable so as to maintain the proper tensions of the various chains used in the transmission system. If the adjustments required exceed the limitations of adjustment possible then it would be necessary that the lengths of the chains be varied by taking out or putting in additional links.

The purpose of the gear connection 70 and 71 is to synchronize the operation of the doughnut machine with the operation of the sleeve turning device. It is necessary that the parts be so synchronized that the sleeves turn at the moment that the doughnut machine is causing the dough to be forced out around the discs 17 to form the doughnut. During the period that the finished doughnut is cut, the sleeves 18 are stationary. Any mechanic familiar with the construction and operation of the doughnut machine and the turning mechanism will readily, without further explanation, be able to synchronize the device as required.

Figures 10, 11:
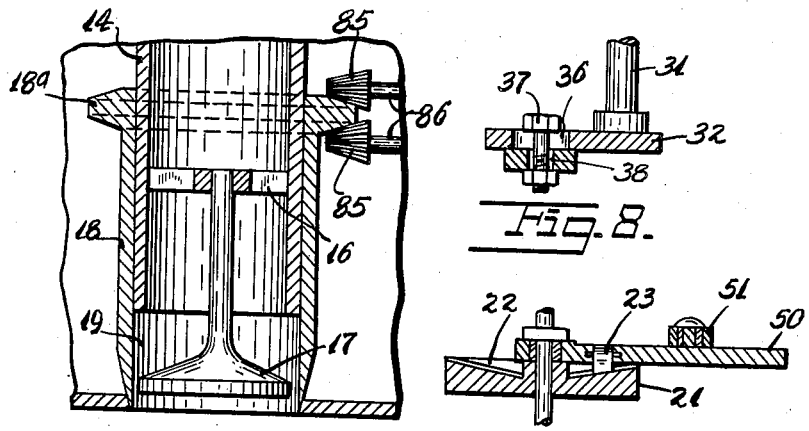
Fig. 10 is a fragmentary vertical sectional view taken on the line 10—10 of Fig. 3.
Fig. 11 is a sectional view of a modified form of drive for the sleeve.
Figure 9:
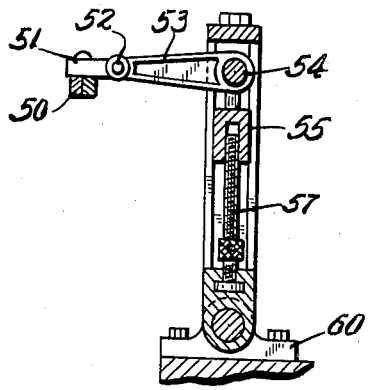
Fig. 9 is a fragmentary transverse vertical sectional view taken on the line 9—9 of Fig. 3.

In Fig. 11 a modified form of the invention has been disclosed which distinguishes from the prior form merely in the method for turning the cutter sleeves 18. In this form of the invention each cutter sleeve has a beveled upper flange 18ᵃ. Beveled friction or other types of driver elements 85 engage the top and bottom faces of the beveled flange 18ᵃ. These elements 85 are mounted on driven shafts 86. These driven shafts may be suitably supported and driven and synchronized as previously explained, the object being to cause the cutter sleeves 18 to periodically turn in synchronization with the doughnut machine as described.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances.

2. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, said gears on the cutting sleeves being annular gears mounted upon the outer sides of the cutting sleeves.

3. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, said transmission system also including a frame mounted in the vicinity of said gears, shafts mounted in brackets adjustably mounted on said frame and provided with gears meshing with said gears, sprockets on said shafts, a second frame, shafts adjustably mounted on the second frame and provided with sprockets, chains connecting the sprockets of the shaft and second shafts, other sprockets on the second shafts, and chains connecting said other sprockets with sprockets mounted upon a shaft supporting said main driver wheel.

4. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, said transmission system also including a frame mounted in the vicinity of said gears, shafts mounted in brackets adjustably mounted on said frame and provided with gears meshing with said gears, sprockets on said shafts, a second frame, shafts adjustably mounted on the second frame and provided with sprockets, chains connecting the sprockets of the shaft and second shafts, other sprockets on the second shafts, and chains connecting said other sprockets with sprockets mounted upon a shaft supporting said main driver wheel, said brackets having slots, bolts engaged through said slots and through other slots formed in the frames to provide for adjustably supporting the shafts.

5. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, comprising a freely turnable radial arm moving in a horizontal plane, said ratchet being mounted on said arm, a vertical radial arm mounted on a horizontal shaft, a connecting arm between said vertical radial arm and said turnable radial arm, a control radial arm mounted on said horizontal shaft, and a cam for moving said control radial arm.

6. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, comprising a freely turnable radial arm moving in a horizontal plane, said ratchet being mounted on said arm, a vertical radial arm mounted on a horizontal shaft, a connecting arm between said vertical radial arm and said turnable radial arm, a control radial arm mounted on said horizontal shaft, and a cam for moving said control radial arm, said cam being mounted on a shaft synchronized with the doughnut machine.

7. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, comprising a freely turnable radial arm moving in a horizontal plane, said ratchet being mounted on said arm, a vertical radial arm mounted on a horizontal shaft, a connecting arm between said vertical radial arm and said turnable radial arm, a control radial arm mounted on said horizontal shaft, and a cam for moving said control radial arm, said cam being mounted on a shaft synchronized with the doughnut machine, said synchronization including a gear on said cam shaft meshing with a gear included in the drive of the doughnut machine.

8. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, comprising a freely turnable radial arm moving in a horizontal plane, said ratchet being mounted on said arm, a vertical radial arm mounted on a horizontal shaft, a connecting arm between said vertical radial arm and said turnable radial arm, a control radial arm mounted on said horizontal shaft, and a cam for moving said control radial arm, said cam being mounted on a shaft synchronized with the doughnut machine, and means for changing the relative positions of the cam and the control arm for varying the throw of the control arm and so indirectly the reciprocation of said ratchet.

9. In a doughnut machine, a plurality of rotatively supported cutting sleeves, a gear on each cutting sleeve, a transmission system for rotating said gears and including a main driver wheel having a concentric annular area of teeth, a ratchet engaging said teeth, and means for reciprocating said ratchet for periodically turning said wheel through predetermined angular distances, comprising a freely turnable radial arm moving in a horizontal plane, said ratchet being mounted on said arm, a vertical radial arm mounted on a horizontal shaft, a connecting arm between said vertical radial arm and said turnable radial arm, a control radial arm mounted on said horizontal shaft, and a cam for moving said control radial arm, said cam being mounted on a shaft synchronized with the doughnut machine, and means for changing the relative positions of the cam and the control arm for varying the throw of the control arm and so indirectly the reciprocation of said ratchet, said means for varying the position of the cam including a means for varying the position of a shaft supporting the cam, and for varying the position of other parts of the transmission system to adapt the same to the new adjusted position of said shaft.

JOHN WACKLER.